United States Patent
Karaoguz et al.

(10) Patent No.: US 7,420,956 B2
(45) Date of Patent: Sep. 2, 2008

(54) DISTRIBUTED STORAGE AND AGGREGATION OF MULTIMEDIA INFORMATION VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 417 days.

(21) Appl. No.: 11/095,638

(22) Filed: Mar. 30, 2005

(65) Prior Publication Data

US 2005/0232210 A1    Oct. 20, 2005

Related U.S. Application Data

(60) Provisional application No. 60/563,894, filed on Apr. 16, 2004.

(51) Int. Cl.
*H04Q 7/24* (2006.01)

(52) U.S. Cl. .............. 370/338; 370/319; 370/320; 370/321; 370/328; 370/339; 455/41.2; 455/41.3; 455/450; 455/451; 455/452.2; 725/37; 725/62; 725/86; 725/87; 725/88; 725/89; 725/105

(58) Field of Classification Search ......... 370/319–321, 370/328, 338–347; 455/450–453, 41.2, 41.3, 455/3.01–3.04; 725/37, 62, 86–89, 105; 379/319–321, 328, 338–343
See application file for complete search history.

(56) References Cited

U.S. PATENT DOCUMENTS

2004/0261112 A1 * 12/2004 Hicks et al. .............. 725/89

* cited by examiner

*Primary Examiner*—Stephen M D'Agosta
(74) *Attorney, Agent, or Firm*—McAndrews, Held & Malloy, Ltd.

(57) ABSTRACT

A system and method for the aggregation of multimedia information storage via a broadband access gateway is disclosed. Information about storage resources accessible to a broadband access gateway may be collected and used in selecting storage capacity used for storing multimedia information such as, for example, streaming video, broadcast video, digitized video, digitized audio, text, and digitized images. The gateway may manage storage and retrieval of the multimedia information based upon user defined criteria and characteristics of the available storage resources. Multimedia information may be parsed for storage across multiple storage resources, and the location and nature of the storage resources used for storage of multimedia information items may be unknown to the user. Storage services accessible via a broadband connection may also be used as storage resources.

53 Claims, 8 Drawing Sheets

Stored Multimedia Information

| Identifier | Type | User | Date Stored | Size | Storage Location |
|---|---|---|---|---|---|
| Jim's Wedding | Video | Dad | 12-16-04 | 217 MB | Dad's PC Drive C |
| Jim's Wedding | Video | Dad | 12-16-04 | 423 MB | Mom's PC Drive C |
| School Concert | Music | Mom | 12-25-03 | 2.32 MB | Mom's PC Drive C |
| Clapton Live! | Music | Teddy | 10-04-03 | 60.1 MB | www.WeStore.com |
| Email backup | Email | Dad | 05-30-01 | 321 KB | Dad's PC Drive C |

Wed, Dec14  2:49PM

FIG. 6

DISTRIBUTED STORAGE AND AGGREGATION OF MULTIMEDIA INFORMATION VIA A BROADBAND ACCESS GATEWAY

RELATED APPLICATIONS

The present application makes reference to, claims priority to, and claims benefit of U.S. Provisional Patent Application Ser. No. 60/563,894, entitled "Method And System For Handling And Backhauling Traffic From A Wired And/Or Wireless WAN, LAN, And/Or PAN Using A Broadband Access Gateway", filed Apr. 16, 2004, the complete subject matter of which is hereby incorporated herein by reference, in its entirety.

The present application makes reference to U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety.

The present application also makes reference to U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety.

The present application also makes reference to U.S. patent application Ser. No. 11/095,842, entitled "Registering Access Device Multimedia Information Via a Broadband Access Gateway" filed Mar. 30, 2005, the complete subject matter of which is hereby incorporated herein by reference, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

The use of digital media is growing at an extremely rapid pace. Most consumers today have a variety of intelligent devices that gather, store, process, generate, communicate, play back, and/or display information electronically, in a digital form. Examples of such devices include digital still and video cameras, personal digital assistants (PDAs), laptop and desktop personal computer (PC) systems, video cassette recorders (VCRs), personal video recorders (PVRs), document and photo scanners, digital and high definition television sets, stereo audio equipment, and cellular phones, to name only a few. Finding storage for the large amounts of data that may be produced by such devices is a constant issue. Those receiving email on portable devices having limited internal memory may wish to archive copies for later reference. Users of digital cameras find their memory cards filled and need to unload them, in order to be able to continue taking photographs. Collectors of digital versions of music and movies require large amounts of storage for their collections. Owners of digital video cameras may find themselves searching for storage to enable them to upload video clips to be sent to relatives, friends, and colleagues.

Once suitable storage is found, a new problem arises. The user must maintain records of the location of each of the items of stored multimedia information, to enable them to later retrieve the material. The user may desire to locate a particular piece of email, a specific video clip, or a certain song. Present day tools fail to provide the functionality to easily identify and retrieve diverse pieces of multimedia information spread over a variety of storage devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and method supporting distribution and aggregation of multimedia information via a broadband access gateway, substantially as shown in and/or described in connection with at least one of the figures, as set forth more completely in the claims.

These and other advantages, aspects, and novel features of the present invention, as well as details of illustrated embodiments, thereof, will be more fully understood from the following description and drawings.

BRIEF DESCRIPTION OF SEVERAL VIEWS OF THE DRAWINGS

FIG. 6 shows an exemplary stored multimedia information screen listing a number of items of multimedia information stored using the storage aggregation functionality of a broadband access gateway such as, for example, the gateway of FIGS. 2, 3, 3A in accordance with a representative embodiment of the present invention.

DETAILED DESCRIPTION OF THE INVENTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention relate to the aggregation of multimedia information storage using a broadband access gateway. Examples of multimedia information include streaming video, broadcast video, voice, digital data, text, digitized audio, digitized still images, digitized video, and digitized music. Devices and systems to which embodiments of the present invention may be applied include, for example, home entertainment equipment (e.g., televisions, video cassette recorders (VCRs), personal video recorders (PVRs) (e.g., TiVo), stereo equipment), a mobile multimedia handsets, personal computers, pagers, and personal digital assistants (PDAs), to name only a few. The aggregation of multimedia information storage may be supported by a broadband access gateway that permits broadband network access via, for example, a personal cellular microcell, a personal area network (PAN), a wired or wireless wide area network (WAN), wireless local area network (WLAN) or other type of network located within a premise such as, for example, a home, office, business, or the like. Services that may be available via such a broadband gateway connection include, for example, access to the public switched telephone network (PSTN); Internet protocol (IP) phone access; extended access to commercial cellular and PCS networks such as, for example, TDMA, CDMA, and GSM; and access to and/or control of a variety of multimedia access devices or networked resources capable of providing streams of images, still pictures, video, and audio; to name only a few. These same networks may enable a user of a representative embodiment of the present invention to store and retrieve multimedia information accessible via any of the listed networks, without detailed knowledge of the actual storage device or its location. The merging of these various types of networks may enable transparent communication of all types of media between access devices and multimedia information storage, which may be coupled in a wired or wireless fashion to one or more of these networks. In an embodiment of the present invention, access to storage services available through a wireless broadband gateway may be simplified, permitting their use by a wider group of users of access devices in, for example, homes, offices, and businesses.

Figure 1:
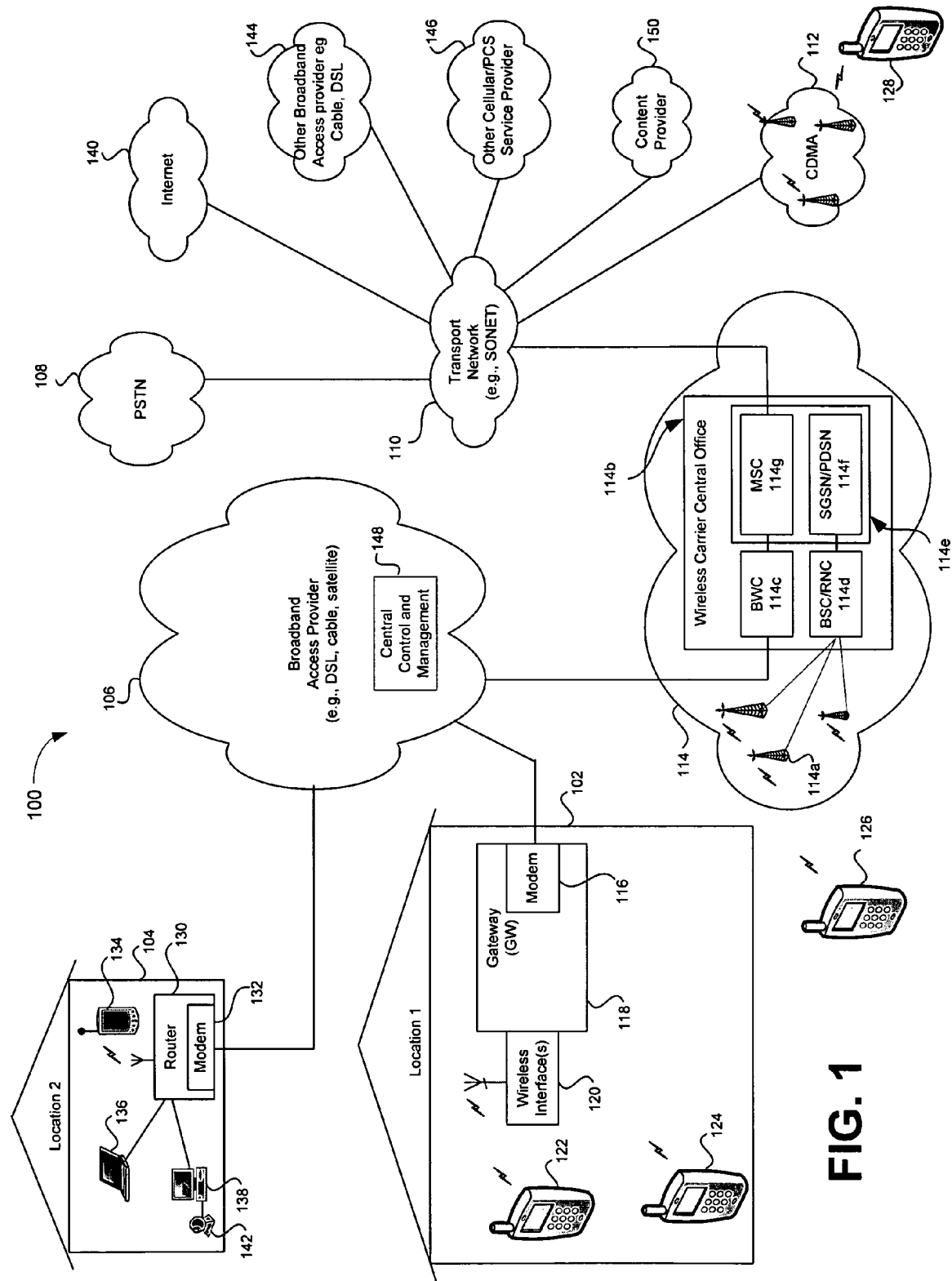
FIG. 1 is a block diagram illustrating an architecture of an exemplary communications system in which a representative embodiment of the present invention may be practiced.

FIG. 1 is a block diagram illustrating an architecture of an exemplary communications system 100 in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultra-wideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultra-wideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family member's into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may chose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118, may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Café, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may chose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video file and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 118.

A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114*a* in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a callers name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called parties terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access devices may be sent to the gateway 118 and may be shared with devices that may be coupled to the gateway 1118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the callers name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
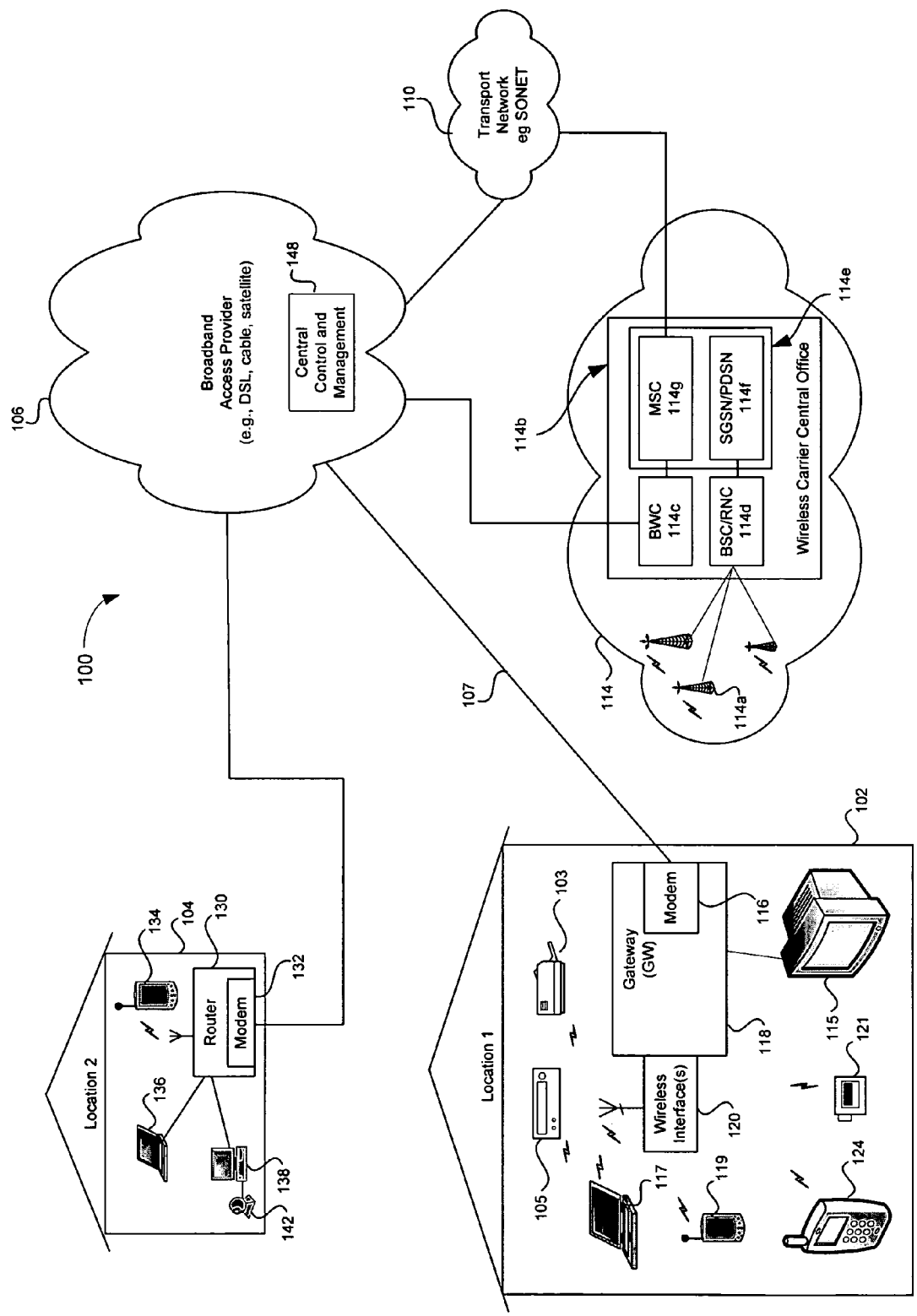
FIG. 2 shows a block diagram illustrating an exemplary communication system, in accordance with a representative embodiment of the present invention.

FIG. 2 shows a block diagram illustrating an exemplary communication system 100, in accordance with a representative embodiment of the present invention. The communication system 100 shown in FIG. 2 comprises a wireless interface 120, a gateway (GW) 118 with a modem 116, and an array of access devices such as, for example, a printer 103, a stereo receiver 105, a laptop 117, a wireless personal digital assistant (PDA) 119, and a digital video camera 121, at location 102. The communication system 100 of FIG. 2 also comprises an access device 124 that may correspond, for example, to the access devices 122, 124, 126 of FIG. 1. A second location 104 within communication system 100 comprises a router 130 with a modem 132, and a plurality of wireless access devices. The plurality of access devices at the second location 104 may, for example, comprise a personal computer (PC) 138, a laptop 136, and a wireless personal digital assistant (PDA) 134. A peripheral such as, for example, a digital camera 142 may be coupled to the personal computer 138. Other peripherals such as, for example, printers, digital scanners, speakers, and the like, that are not shown in FIG. 2, may also be coupled to the personal computer 138 and/or laptop 136. The wireless interface 120 may comprise a plurality of interfaces such as, for example, a Bluetooth interface, a cellular interface, and any combination of an IEEE 802.11a, b, g, and/or n interface, and/or an IEEE 802.15.3a ultra-wideband interface. Although the following discussion refers frequently to the capabilities and actions of the gateway 118 and wireless interface 120, the same may be said of the router 130 with modem 132 of FIGS. 1 and 2, for example, without departing from the spirit and scope of the present invention.

In accordance with a representative embodiment of the present invention, a wireless access device such as access device 124 may be mobile, and may move between the personal area network/wireless local area network coverage provided by wireless interface 120 at location 102, the wide area network coverage provided by, for example, GSM network 114, and the coverage provided by the router 130 and modem 132 at location 104. The location 102 may, for example, be the home of the user of the access device 124, the home of a friend or relative of the user of access device 124, or an office, business, etc., where the user of access device 124 may travel. The location 104 may, for example, be a second home of the user of access device 124, the home of a friend or relative, an office, or may have no personal or business relationship with the user of access device 124. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to the communication bandwidth of a broadband network as previously described may be provided by the gateway 118 and the modem 116 to wired or wireless access devices in the vicinity of location 102, and via router 130 and modem 132 to wired or wireless access devices in the vicinity of location 104, as shown in FIG. 2. This architecture may provide extended access to wireless networks such as, for example, the GSM network 114, CDMA network 112, other cellular/PCS service provider 146, Internet 140 and public switched telephone network 108, of FIG. 1. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 to location 104, and via transport network 110 to, for example, GSM network 114.

In the example illustration of FIG. 2, a user of the access device 124 may or may not be engaged in communication with another system or subscriber accessible via the GSM network 114, or other wide area network of FIG. 1. Although the present example of FIG. 2 shows a GSM network 114, a representative embodiment of the present invention may be employed with respect to other wide area networks such as, for example, the CDMA network 112 and other cellular/PCS service provider 146, shown in FIG. 1.

When an access device such as, for example, the access device 124 of FIG. 2 moves into the coverage area of a personal area network/wireless local area network of, for example, the wireless interface 120 and gateway 118, or the router 130, the access device 124 may be authenticated by the gateway 118 or router 130. The authentication may involve the sharing or exchange of identification and/or authentication information by the access device 124 with the gateway 118 or router 130. Details of an example of such an interaction are provided in U.S. patent application Ser. No. 11/039,020, entitled "Method And System For Providing Registration, Authentication, And Access Via A Broadband Access Gateway", filed Jan. 18, 2005, the complete subject matter of which is hereby incorporated herein by reference, in its entirety. Once the access device 124 has been authenticated to the gateway 118, the access device 124 may be permitted to exchange multimedia information and services available via the access devices in communication with the gateway 118, or via networks connected to the gateway 118. Information about the available multimedia information and services may be shared by and/or with the access device 124 via information exchanged by the access device 124 and the gateway 118 or router 130. Additional information about the advertising of such information may be found in U.S. patent application Ser. No. 11/021,294, entitled "Method And System For Extended Network Access Services Advertising Via A Broadband Access Gateway", filed Dec. 23, 2004, the complete subject matter of which is hereby incorporated herein by reference, in its entirety. In a representative embodiment of the present invention, a broadband access gateway such as, for example, the gateway 118 or the router 130 of FIG. 2 may maintain a database of the information about the available multimedia information and services, described above. Details of an example of such a database of information about access device data may be found in U.S. patent application Ser. No. 11/095,842, entitled "Registering Access Device Multimedia Content Via A Broadband Access Gateway", filed Mar. 30, 2005, the complete subject matter of which is hereby incorporated herein by reference, in its entirety.

In a representative embodiment of the present invention, an access device such as, for example, the laptop 117 and digital video camera 121, at location 102, and the laptop 136 and the personal computer 138, at location 104, may be capable of storing multimedia information delivered via a broadband access gateway such as, for example, the gateway 118 of FIG. 2. In addition, resources accessible via a broadband network such as, for example, a digital subscriber line network, a satellite network, an Internet network, or private network that is accessible via the modem 116 may be capable of storing multimedia information for the user of an access device in communication with the gateway 118 or the router 130.

Many access devices like those described with respect to FIGS. 1 and 2 have the basic functionality necessary to enable them to act as storage devices for multimedia information. For example, it is common for present day personal computers such as, for example, the laptop 117 at location 102, and the laptop 136 and personal computer 138 at location 104, to have a hard disk drive, and a writeable compact disk (CD) drive or a writeable digital versatile disk (DVD) drive for the storage of data, programs, and media files. Such storage devices may be employed by a representative embodiment of the present invention as a storage resource that may be made available to users of other access devices in communication with a broadband access gateway.

Figure 3:
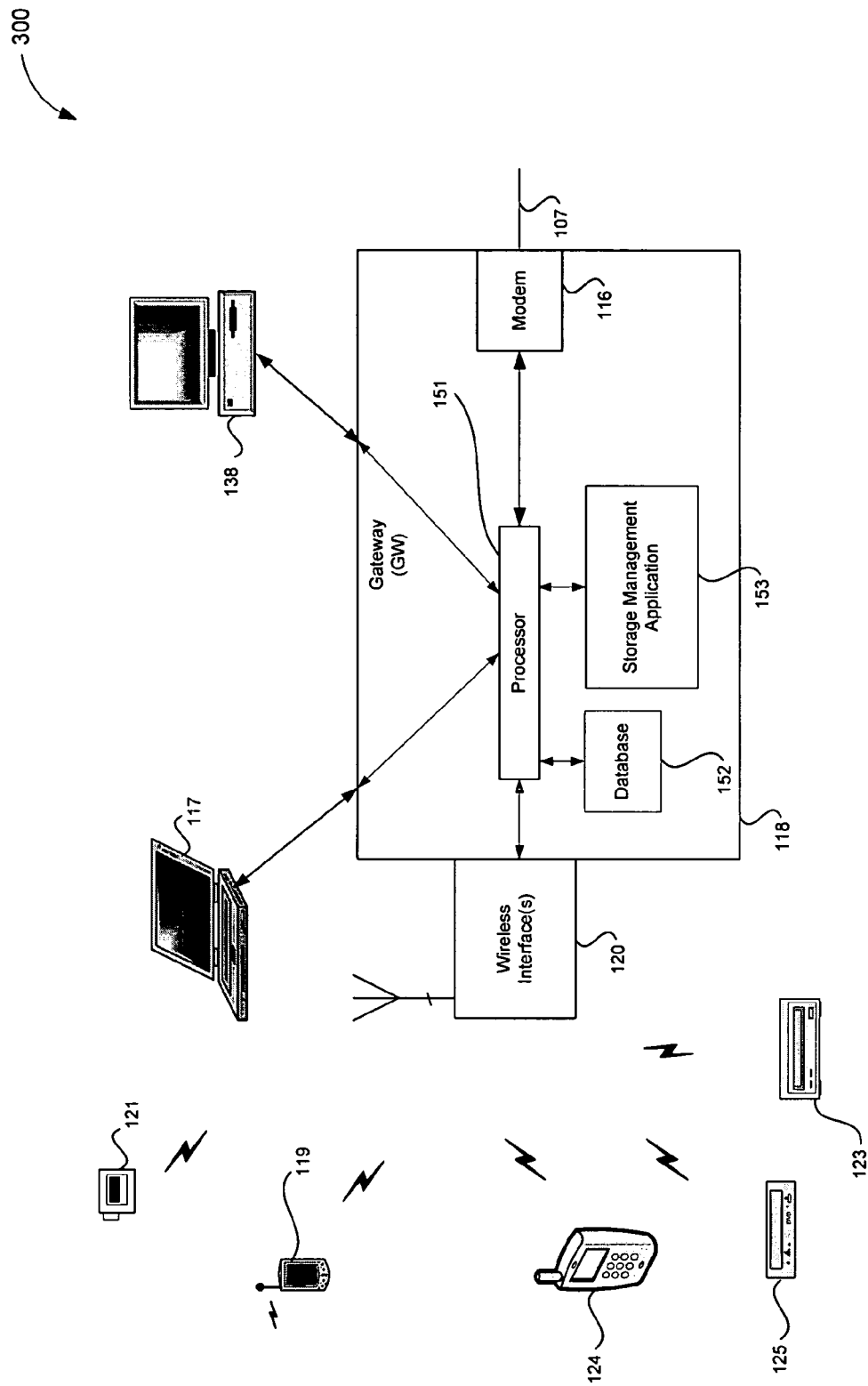
FIG. 3 shows a block diagram of an exemplary communication system supporting aggregation of multimedia information storage that may correspond, for example, to a portion of the communication system of FIG. 2, in accordance with a representative embodiment of the present invention.

FIG. 3 shows a block diagram of an exemplary communication system 300 supporting aggregation of multimedia information storage that may correspond, for example, to a portion of the communication system 100 of FIG. 2, in accordance with a representative embodiment of the present invention. The communication system 300 of FIG. 3 comprises a gateway 118 that may correspond, for example, to the gateway 118 or the router 130 of FIG. 2. The gateway 118 in FIG. 3 comprises a processor 151 that is communicatively coupled to a wireless interface 120, a modem 116, and a laptop 117. The wireless interface 120, the modem 116, and the laptop 117 may correspond, for example, to the wireless interface 120, the modem 116, and the laptop 117 of FIG. 2. The modem 116 may provide the gateway 118 with access to a broadband connection 107 that may, for example, comprise a digital subscriber line (DSL) connection, a cable network connection, a satellite connection, a T1 or T3 network connection, or similar broadband communication link to a broadband access provider (BAP) 106. As shown in FIG. 3, the wireless interface 120 is communicatively coupled to a number of access devices including the access device 124, a wireless personal digital assistant 119, a digital versatile disc (DVD) unit 125, a personal video recorder (PVR) 123, and a digital video camera 121. The gateway 118 of the communication system 300 of FIG. 3 also comprises a database 152 and a storage management application 153 that are accessible to the processor 151. The wireless interface 120 may comprise any combination of interfaces such as, for example, a Bluetooth interface, an IEEE 802.11a, b, g and/or n interface, and an IEEE 802.15.3a ultra-wideband interface. Although many of the access devices shown in FIG. 3 are illustrated as being in wireless communication with the gateway 118, use of either wired or wireless communication may be employed without departing from the spirit and scope of the present invention. In addition, the access device 124 and PDA 119 may be capable of communication via either or both of the wireless interface 120 and a wireless wide area network (WAN) such as, for example, the GSM network 114 of FIG. 2.

A broadband access gateway in accordance with a representative embodiment of the present invention may facilitate the storage and retrieval of multimedia information by a user of an access device such as, for example, the access device 124. A broadband access gateway such as, for example, the gateway 118 of FIG. 3 may identify accessible storage resources, and may make those storage resources available to a user of an authorized access device via either or both of the wireless interface 120, and the modem 116 and the broadband connection 107. Information about the storage resource available on each of the access devices in communication with the broadband access gateway may be gathered, for example, during registration of access device services and data. This may occur, for example, when each access device enters into communication with the gateway 118, or periodically thereafter. An example, of one such resource registration mechanism may be found in U.S. patent application Ser. No. 11/095, 842, entitled "Registering Access Device Multimedia Content Via a Broadband Access Gateway" filed Mar. 30, 2005, the complete subject matter of which is hereby incorporated herein by reference, in its entirety. A broadband access gateway in accordance with a representative embodiment of the present invention may use such a mechanism to detect the presence of an access device that is accessible to a broadband access gateway via either wired or wireless link, and may authenticate that access device. The broadband access gateway may then collect information about the multimedia information and media related services available on each access device, including the availability of any unused storage, and may build a database of the collected information such as, for example, the database 152 illustrated in FIG. 3.

In a representative embodiment of the present invention, a broadband access gateway such as, for example, the gateway 118 may, upon identifying an available storage resource, classify the resource according to various characteristics. Examples of such characteristics may including, for example, the speed of the storage device, the cost of storage, the expected security or privacy of items stored on the device, the expectation of future accessibility of the storage device, the available capacity of the device, and a number of others factors. The gateway 118 may then use such characteristics along with user-defined criteria to select a suitable storage resource, when a user request for storage of multimedia information is received. In accordance with a representative embodiment of the present invention, a broadband access gateway such as, for example, the gateway 118 or the router 130 of FIG. 3, need not comprise sufficient storage on which to save the multimedia information of the user. The gateway 118 may act as an aggregator or manager of the storage of multimedia information across multiple storage resources.

A representative embodiment of the present invention may provide a user interface comprising an icon that represents a storage function. The user of the access device need not have knowledge of the actual physical location(s) of the available storage, or of the storage media used. The storage represented by the icon may, in fact, comprise a number of blocks of storage of various sizes, available on a number of different access devices or on a storage service accessible via a broadband network such as, for example, the broadband connection 107 of FIG. 3. It is a function of a representative embodiment of the present invention to maintain a database of information about storage that is available, to allocate space from the available storage upon receipt of a user request, and to track the stored information to enable later retrieval.

In a representative embodiment of the present invention, a broadband access gateway such as, for example, the gateway 118 or the router 130 may use the database 152 containing information about stored multimedia information items to identify the storage locations of the requested multimedia information, and to manage or coordinate the retrieval, reassembly, and delivery to the user of the multimedia information from the identified storage locations.

In a representative embodiment of the present invention, a user may specify the particulars of access devices upon which multimedia information may be stored. For example, a user of an access device may have in their home a broadband access gateway such as, for example, the gateway 118 or the router 130. The broadband access gateway may have access to the remaining storage capacity on, for example, a hard drive of a personal computer such as the personal computer 138 FIG. 3. The user may also have knowledge of a storage service accessible via the broadband connection 107. In a representative embodiment of the present invention, a user may identify specific storage resources to be used by a broadband access gateway such as, for example, the gateway 118, to store multimedia information.

Figure 3A:
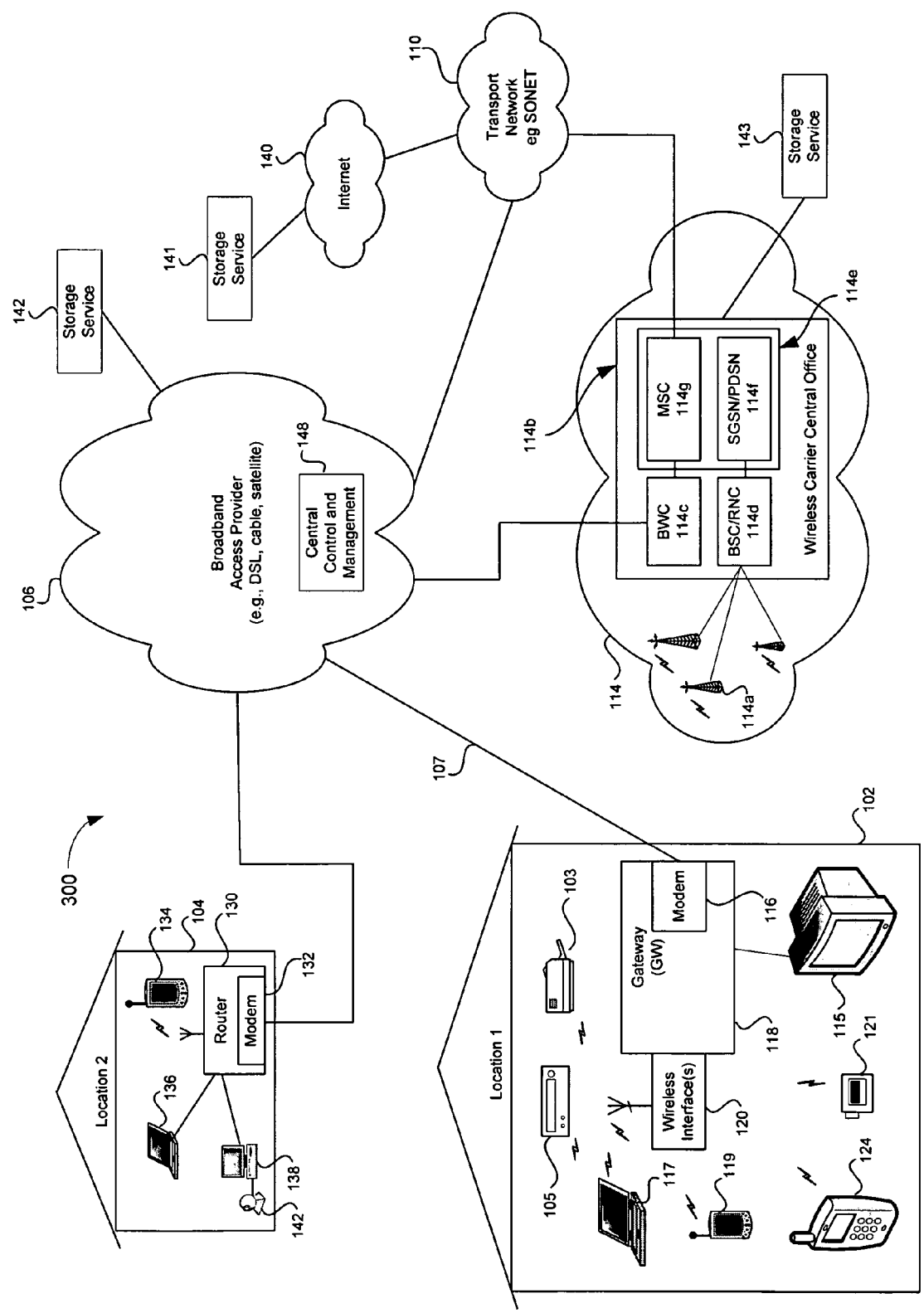
FIG. 3A shows an exemplary communication system comprising storage services that may be employed as a storage resource by a broadband access gateway, in accordance with a representative embodiment of the present invention.

FIG. 3A shows an exemplary communication system 300 comprising storage services 141, 142, 143 that may be employed as a storage resource by a broadband access gateway, in accordance with a representative embodiment of the present invention. The elements of the illustration shown in FIG. 3A may correspond, for example, to the elements of FIG. 3 having the same numeric identifiers. In the illustration of FIG. 3A, the storage service 141 is accessible to the gateway 118 with the modem 116 via a broadband connection 107, broadband access provider 106, transport network 110, and Internet network 140. The storage service 142 is communicatively coupled to the BAP 106, and the storage service 143 is accessible via the wireless carrier central office 114b of GSM network 114. A representative embodiment of the present invention may employ a storage service such as, for example, the storage services 141, 142, 143 to enable the storage of multimedia information of a user. For example, a storage service communicatively accessible to the gateway 118 of FIG. 3A may support storage of only a portion of or the entirety of multimedia information of users of access devices such as the access device 124, the laptop 117, and the PC 138 of FIG. 3A. A storage service such as the storage services 141, 142, 143 may be identified by information such as, for example, an Internet protocol (IP) address, a media access control (MAC) address, an International Mobile Station Identifier (IMSI) address, and a Mobile Identification Number (MIN) address, a manufacturer identifier, a model identifier, and a type identifier.

In a representative embodiment of the present invention, a broadband access gateway such as for example, the gateway 118 or the router 130 of FIG. 3A may determine that requested multimedia information is inaccessible. This may be due to the fact that the storage resource used to store a portion or all of the desired multimedia information is a removable storage device such as, for example, a removable hard disk drive, a CD-R/W disk, a video cassette, or another form of removable media. In another instance, the desired multimedia information may have been stored on a storage device that is no longer in communication with the gateway 118 such as, for example, the laptop 117 when a user of the laptop 117 has severed communication with the gateway 118 (e.g., moved it to a new location). In such circumstances, a representative embodiment of the present invention may inform the user attempting the retrieval of the inability to access the desired multimedia information, and may provide information to the user about the storage resource such as, for example, the identity of the storage resource, the location of the storage resource, possibly enabling the user to once again make the multimedia information available. For example, in the case of removable media such as a writeable DVD, a CD-R/W disk, or a digital video cassette, the user may use the information provided to locate and return the removable media to the access device in communication with the gateway 118.

Figure 4:
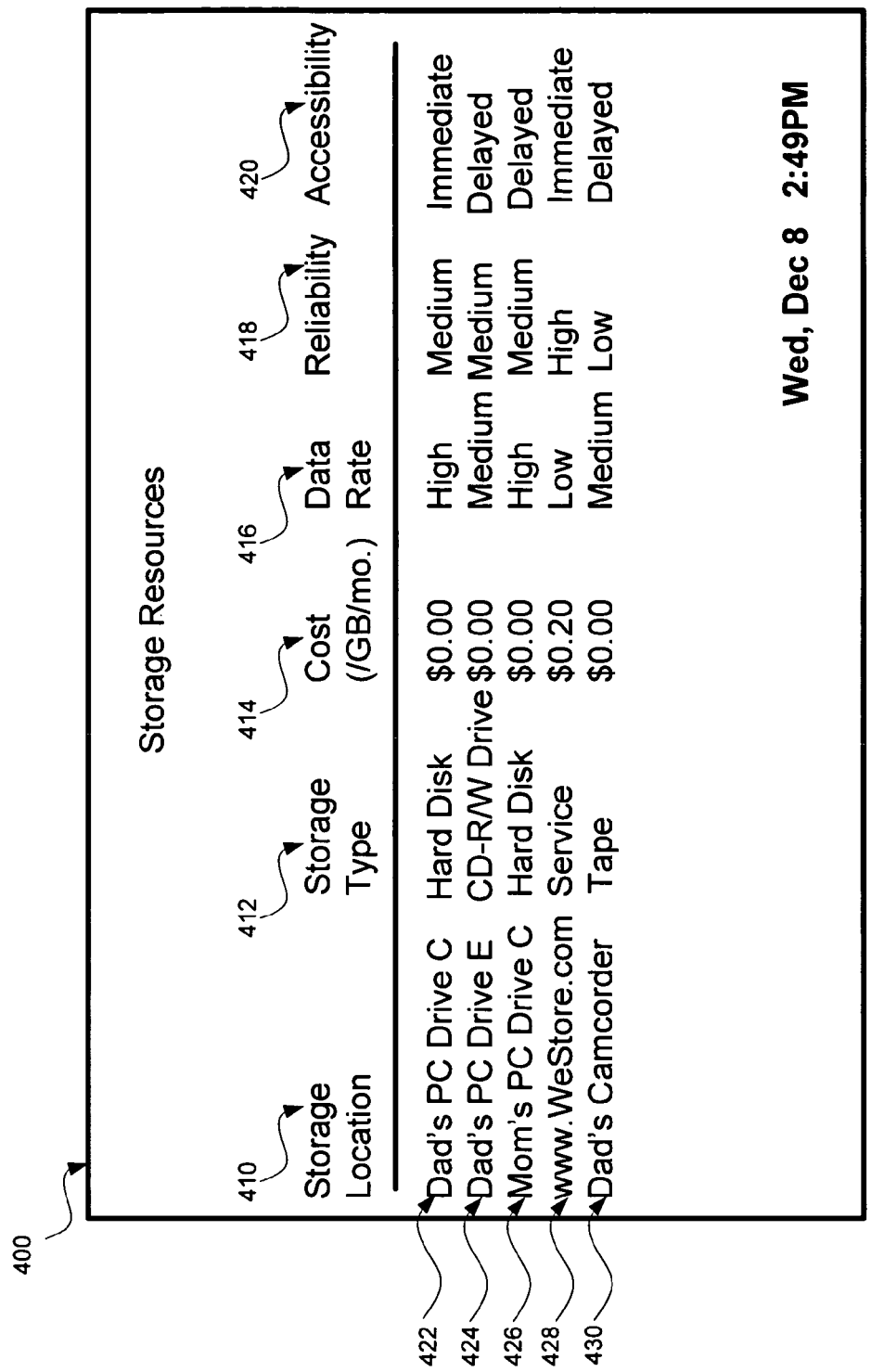
FIG. 4 shows an exemplary storage resource screen for use in specifying the particulars of storage resources to be used by a broadband access gateway such as, for example, the gateway of FIGS. 2, 3, 3A for storing multimedia information, in accordance with a representative embodiment of the present invention.

FIG. 4 shows an exemplary storage resource screen 400 for use in specifying the particulars of storage resources to be used by a broadband access gateway such as, for example, the gateway 118 of FIGS. 2, 3, 3A for storing multimedia information, in accordance with a representative embodiment of the present invention. The storage resource screen 400 illustrated in FIG. 4 is arranged in a tabular format comprising a "Storage Location" column 410, a "Storage Type" column 412, a "Cost" column 414, a "Data Rate" column 416, a "Reliability" column 418, and an "Accessibility" column 420. Five entries are shown for four different types of storage resources comprising a "Dad's PC Drive C" entry 422, a "Dad's PC Drive E" entry 424, a "Mom's PC Drive C" entry 426, a "www.WeStore.com" entry 428, and a "Dad's Camcorder" entry 430. The storage resource screen 400 is only one example of a user interface that may be presented to a user of an access device such as, for example, the access device 124, the laptop 117, or the PC 138 shown in FIG. 3. Other forms of user interface such as, for example, a graphical user interface, or a user interface presenting a different arrangement or assortment of information may be employed without departing from the spirit and scope of the present invention. The information represented in the storage resource screen 400 may have been provided by a user, or may have been generated as a result of search or registration activities of a broadband access gateway in accordance with a representative embodiment of the present invention.

Referring to FIG. 4, the "Dad's PC Drive C" entry 422 indicates that a storage resource of type "Hard Disk" is present on "Dad's PC Drive C", has a cost (e.g., in dollars per gigabyte per month) of $0.00, supports high-speed data transfer, is considered to be medium in reliability, and is immediately accessible. In contrast, the storage resource listed in the "Dad's PC Drive E" entry 424 is of type "CD-R/W Drive", also has a cost of $0.00 per gigabyte-month, supports medium-speed data transfer, is considered to be medium in reliability, and may be subject to delays in accessibility (e.g., if a disk is not in the drive or has no remaining storage capacity). The "www.WeStore.com" entry 428 illustrates an example of a storage resource that may be accessible via a broadband network connected to a broadband access gateway such as, for example, the broadband connection 107 communicatively coupled to the gateway 118 of FIG. 3. This particular storage resource is shown in FIG. 4 as type "Service", with a storage cost of $0.20 per gigabyte per month. The data transfer rate of this resource is indicated to be low, the reliability to be high, and this storage resource is considered to be immediately accessible. The "Dad's Camcorder" entry 430 illustrates an example of a storage resource comprising a digital video camera such as, for example, the digital video camera 121 shown in FIG. 3. The type of this storage resource is shown as "Tape". The cost per gigabyte per month is shown as $0.00, that may be due to the large capacity and low cost of the storage medium. The data rate is shown as low, the reliability is considered to be low, and the accessibility is subject to delays such as, for example, when an appropriate tape is not present in the digital video camera 121. The information represented in the storage resource screen 400 may be employed by a representative embodiment of the present invention when selecting a storage resource for the multimedia information of a user. The storage resource characteristics shown in columns 412, 141, 416, 418, 420 of FIG. 4 may be used, for example, in a selection process employing user defined criteria.

Figure 5:
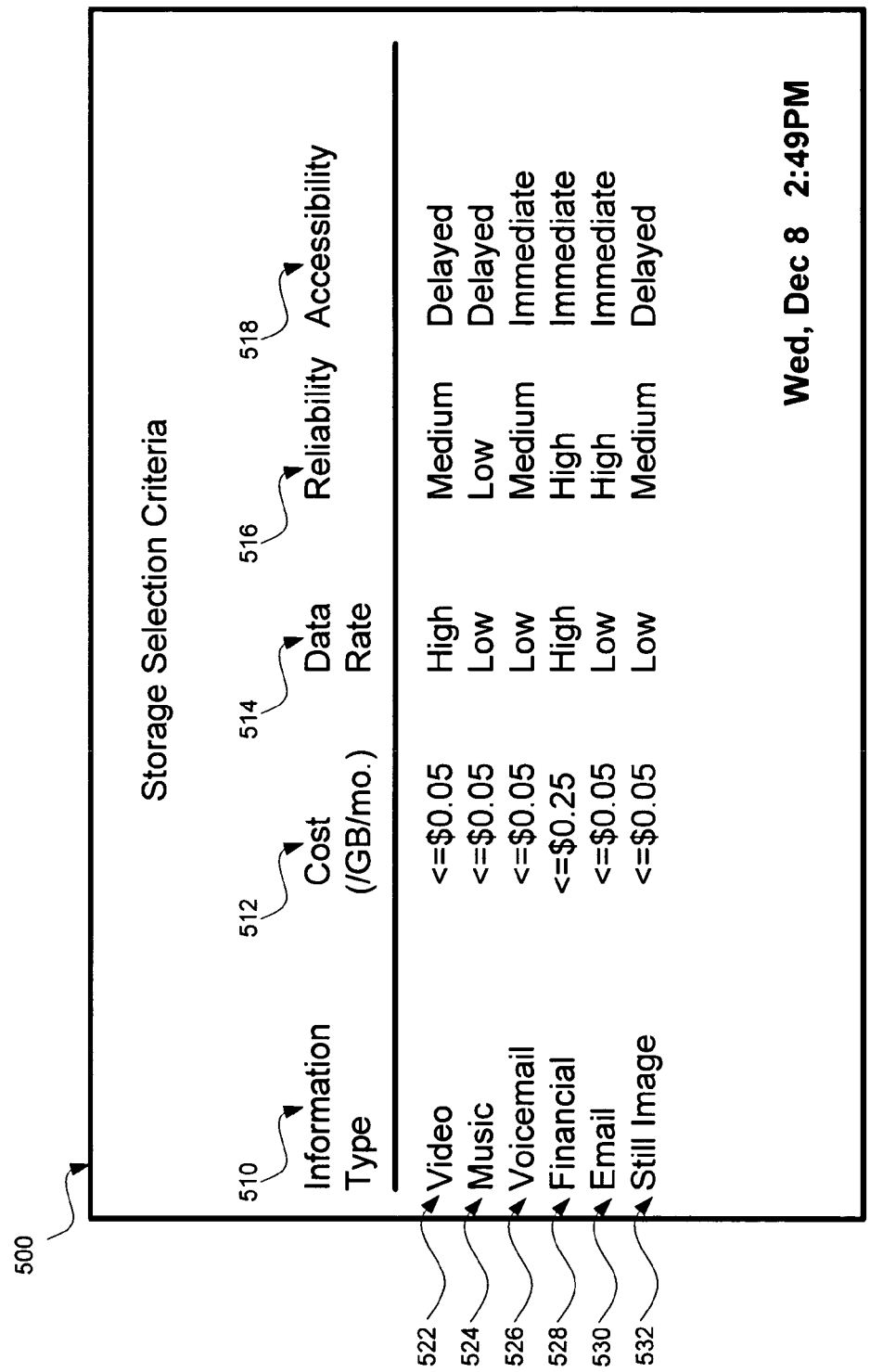
FIG. 5 shows an exemplary storage selection criteria screen for use in specifying the desirable characteristics of candidate storage resources to be used by a broadband access gateway such as, for example, the gateway of FIGS. 2, 3, 3A in storing multimedia information, in accordance with a representative embodiment of the present invention.

FIG. 5 shows an exemplary storage selection criteria screen 500 for use in specifying the desirable characteristics of candidate storage resources to be used by a broadband access gateway such as, for example, the gateway 118 of FIGS. 2, 3, 3A in storing multimedia information, in accordance with a representative embodiment of the present invention. The storage selection criteria screen 500 illustrated in FIG. 5 is arranged in a tabular format comprising an "Information Type" column 510, a "Cost" column 512, a "Data Rate" column 514, a "Reliability" column 516, and an "Accessibility" column 518. Six entries are shown representing the criteria for storage resources used to store six different types of multimedia information comprising a "Video" entry 522, an "Music" entry 524, an "Voicemail" entry 526, a "Financial" entry 528, an "Email" entry 530, and a "Still Image" entry 532. The storage selection criteria screen 500 is only one example of a user interface that may be presented to a user of an access device such as, for example, the access device 124, the laptop 117, or the PC 138 shown in FIG. 3. Other forms of user interface such as, for example, a graphical user interface, or a user interface presenting a different arrangement or assortment of information may be employed without departing from the spirit and scope of the present invention.

In the illustration of FIG. 5, a set of criteria represented by the "Video" entry 522 indicates that the user desires to store multimedia information identified as "Video" on a storage device for which the costs do not exceed $0.05 per gigabyte per month, that the device support a high data transfer rate (i.e., speed), that the storage device be of medium reliability, and that the user is accepting of delayed access to the storage device. The criteria illustrated for a storage device to be used for storing multimedia information identified in the "Music" entry 524 shows that the cost is not to exceed $0.05 per gigabyte per month, that a device supporting a low data rate is acceptable, that the user is accepting of a storage device of low reliability, and that access to information on the storage device may be delayed. The criteria for the storage device used for storing multimedia information represented by the "Voicemail" entry 526 shows that the cost is not to exceed $0.05 per gigabyte per month, that support of a low data rate is acceptable, that the user is accepting of a storage device having medium reliability, and that immediate access to stored information is desired. Somewhat different criteria have been defined by the user of the example of FIG. 5 for the storage of financial records, as shown in the "Financial" entry 528. In this case, the user is accepting of a higher cost of storage (i.e., up to $0.25 per gigabyte per month), that the data rate of transfers be high, that a highly reliable storage resource be used, and that the stored information be immediately accessible. In contrast, storage resources used for email, as shown in "Email" entry 530 may be limited to no more than $0.05 per gigabyte per month, that the selected storage resource be of high reliability, and that email information be immediately accessible. As shown in the illustration of FIG. 5, storage selection criteria for the "Still Image" entry 532 have bee=n set such that the cost of the storage resource should not exceed $0.05 per gigabyte per month, the data transfer rate may be low, the reliability of the storage resource should be medium, and the accessibility may be delayed. Although the illustration of FIG. 5 comprises six identified information types, this does not represent a particular limitation of the present invention, as other information types and a different set of storage selection criteria may be employed without departing from the spirit and scope of the present invention.

A broadband access gateway in accordance with a representative embodiment of the present invention may classify multimedia information for storage into one of a number of different categories such as, for example, those shown in the information type column 510 illustrated in FIG. 5. For example, a broadband access gateway such as, for example, the gateway 118 or the router 130 of FIG. 3 may examine the contents or associated meta data of multimedia information to be stored. Statistical characteristics, predefined data sequences, file header information, a file extension or filename, or other meta data may be used to classify a particular grouping or item of multimedia information as being of a particular type. The classification of each stored item or grouping of multimedia information may be used to organize multimedia information by information type. For example, a broadband access gateway may create a database of stored multimedia items where the items are indexed by a number of parameters including, for example, the information type, the storage date and time, the size of the item, the date and time of creation of the multimedia information, the user performing the storage, the location of the storage resource(s) used to store the item, and numerous other aspects. Later, when a user seeks to retrieve a one or more items of multimedia information, the user may be presented with, for example, a text listing or a group of icons representing the various dimensions or categories under which the broadband access gateway classified each of the stored multimedia information items. The user may also be provided with search tools to allow searching of all stored multimedia information items, or those within a particular category or type (e.g., video, music, voicemail, etc.), those stored on a particular date, by a particular user, etc.

A representative embodiment of the present invention may make available to the user information about where multimedia information items have been stored. Such information may identify particulars of the storage on the device such as, for example, an information type, a storage device type, a volume identifier, a filename, an Internet protocol (IP) address, a universal resource locator (URL), a service identifier, and an identifier of the user storing the multimedia information, among a variety of other aspects. Additional information including, for example, a date of storage, and a size of the portion of stored multimedia information may also be made available.

A broadband access gateway in accordance with a representative embodiment of the present invention such as, for example, the gateway 118 or the router 130 may determine that no one storage resource is capable of accepting the entire amount of multimedia information to be stored, and may parse the multimedia information for storage into portions able to be stored on available storage resources. The broadband access gateway may distribute the portions across the available storage resources without involving a user, and the user seeking to store the multimedia information may be unaware of the storage resource(s) used. In a complementary fashion, a broadband access gateway such as, for example, the gateway 118 or the router 130 may reassemble the distributed portions of stored multimedia information from the various storage resources, upon receipt of a request to access the stored multimedia information.

In a representative embodiment of the present invention, support for aggregation of multimedia storage may be provided to the user in the form of a designated icon of a user interface. The user interface may permit a user to simply "drag and drop" icons representing multimedia information to be stored onto the designated icon representing the storage aggregation functionality in order to store the multimedia information. A user of a representative embodiment of the present invention may not be involved in the specifics of the storage resources used, their location, etc., and may accept the storage resource(s) used based upon the user-defined storage selection criteria described above. In addition, a user may select an icon representing the storage aggregation functionality to open an interface displaying information about stored multimedia information.

FIG. 6 shows an exemplary stored multimedia information screen 600 listing a number of items of multimedia information stored using the storage aggregation functionality of a broadband access gateway such as, for example, the gateway 118 of FIGS. 2, 3, 3A, in accordance with a representative embodiment of the present invention. The stored multimedia information screen 600 illustrated in FIG. 6 is arranged in a tabular format comprising an "Identifier" column 610, a "Type" column 612, a "User" column 614, a "Date Stored" column 616, a "Size" column 618, and a "Storage Location" column 620. Five entries are shown representing the storage of four multimedia items comprising two "Jim's Wedding" entries 620, 622, a "School Concert" entry 624, an "Clapton Live!" entry 626, and an "Teddy's Email" entry 628. The stored multimedia information screen 600 of FIG. 6 is only an example of one user interface that may be presented to a user of an access device such as, for example, the access device 124, the laptop 117, or the PC 138 shown in FIG. 3. Other forms of user interface such as, for example, a graphical user interface, or a user interface presenting a different arrangement or assortment of information may be employed without departing from the spirit and scope of the present invention. The illustration of FIG. 6 shows that the multimedia information item with "Jim's Wedding" in the "Identifier" column 610 comprises multimedia information stored on two storage resources "Dad's PC Drive C" and "Mom's PC Drive C". The "Jim's Wedding" entry 622 shows that 217 megabytes of type "Video" were stored on "Dad's PC Drive C" on Dec. 16, 2004, while the "Jim's Wedding" entry 624 indicates that an additional 423 megabytes of type "Video" were stored on "Mom's PC Drive C" on the same date. The "School Concert" entry 626 shows that 2.32 megabytes of type "Music" were stored on storage resource "Mom's PC Drive C" by "Mom" on Dec. 25, 2003. Multimedia information identified as "Clapton Live!" was stored by "Teddy" on Oct. 4, 2003 on storage service "www.WeStore.com", occupying 60.1 megabytes of space. Finally, the last entry of FIG. 6 shows that "Dad" stored 321 kilobytes of type "Email" on the storage resource "Dad's PC Drive C" on May 30, 2001.

Figure 7:
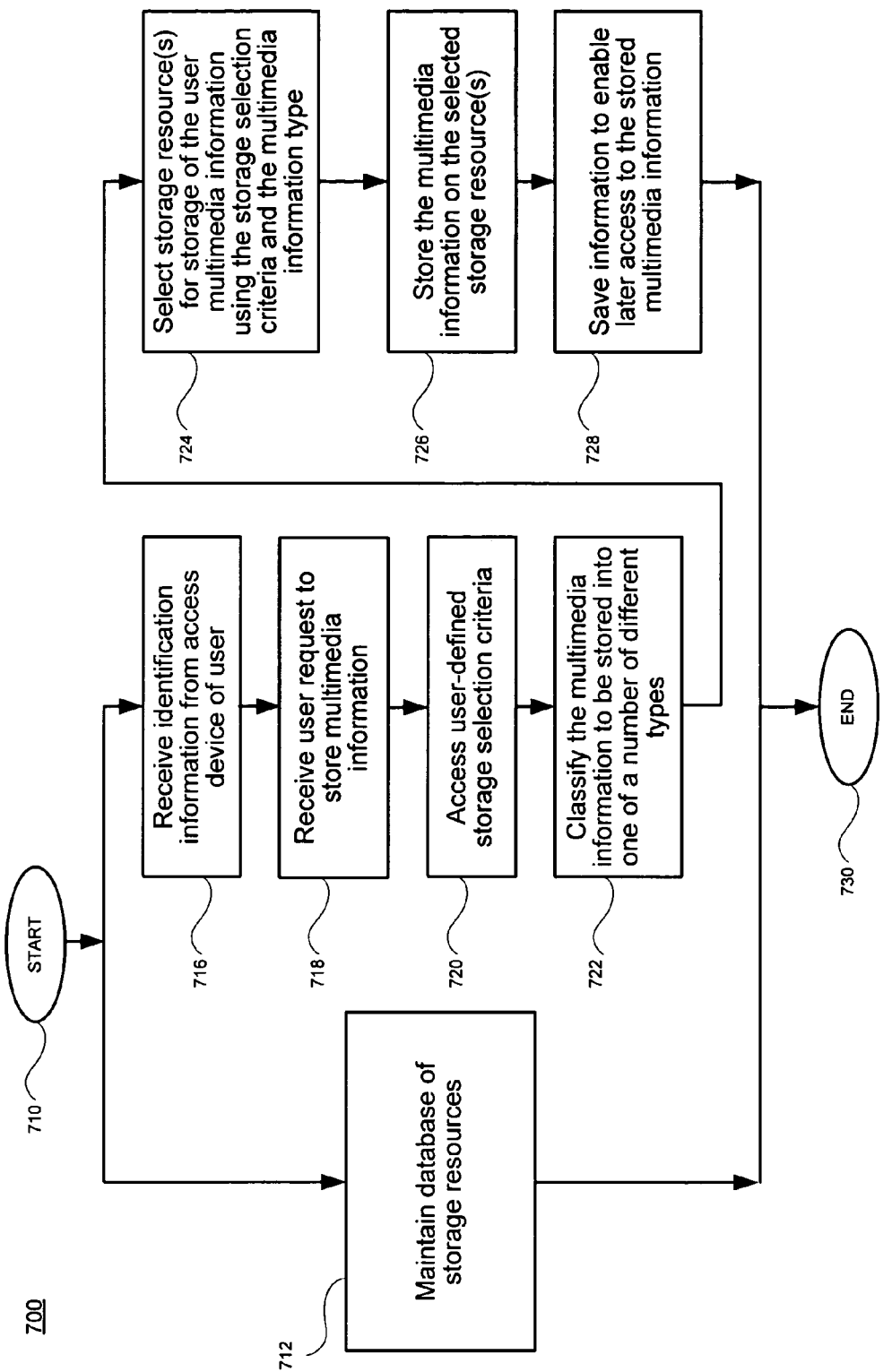
FIG. 7 shows a flowchart of an exemplary method supporting aggregation of multimedia information via a broadband access gateway such as, for example, the gateway of FIGS. 2, 3, 3A, in accordance with an embodiment of the present invention.

FIG. 7 shows a flowchart of an exemplary method supporting aggregation of multimedia information via a broadband access gateway such as, for example, the gateway 118 of FIGS. 2, 3, 3A, in accordance with an embodiment of the present invention. As an aid to understanding, the following description of the method of FIG. 7 makes reference to the elements of FIG. 2. The flowchart of FIG. 7 is arranged having a left and a right path, to illustrate that the activities of the two paths may proceed in parallel. The method of FIG. 7 begins when a broadband access gateway such as, for example, the gateway 118 is powered up (block 710). In the left path of FIG. 7, a broadband access gateway such as, for example, the gateway 118 may act to maintain a database of storage resources accessible to the gateway 118 (block 712). For example, the gateway 118 may collect, among other things, information about storage resources available on each of the access devices with which it is in communication. This may include access devices such as, for example, the laptop 117, the wireless PDA 119, and the personal video recorder 123 of FIG. 3. In addition, the gateway 118 may seek information about storage resources available via, for example, a broadband network connection such as the broadband network 107. Such information may be received, for example, during the registration of an access device as described above, may be periodically requested by the gateway 118, or may be provided by a user. Such storage resources may comprise multimedia information storage on storage resources such as, for example, hard disk drives, floppy disk drives, optical (CD and DVD) devices, digital tape, solid state (FLASH) memory, and a variety of other storage media. The method shown in FIG. 7 then ends (block 730). Although the method as illustrated in FIG. 7 ends at block 730, it is shown in this manner for reasons of clarity. In a representative embodiment of the present invention, the actions of the left path of FIG. 7 may be performed repeatedly.

Referring now to the right path of the flowchart of FIG. 7, a broadband access gateway such as, for example, the gateway 118 of FIG. 3 may receive identification information from the access device of a user (block 716). This may occur, for example, when the access device first comes into communication with a broadband access gateway such as, for example, the gateway 118, or periodically while in communication with the gateway 118. Some of the information received may become a part of the database referenced above with respect to block 712 that may correspond to, for example, the database 152 of FIG. 3. Next, a representative embodiment of the present invention may receive a user request to store multimedia information (block 718) Multimedia information may comprise, for example, streaming video, broadcast video, voice, digital data, text, digitized audio, digitized still images, digitized video, and digitized music. The gateway 118 may then access user-defined storage selection criteria (block 720). An example set of storage selection criteria is described with respect to FIG. 5, above. The gateway 118 may then classify the multimedia information to be stored into one of a number of different types (block 722). As described above, statistical characteristics, predefined data sequences, file header information, a file extension or filename, or other meta data may be used to classify multimedia information as being of a particular type. A broadband access gateway in accordance with a representative embodiment of the present invention may then select the storage resource(s) for storage of the user multimedia information, using the storage selection criteria and multimedia information type (block 724). For example, the gateway 118 may match criteria corresponding to the type of the multimedia information to be stored, to the characteristics of the available storage resources. If no resource matches all criteria, a best choice may be made. Next, the gateway 118 may store the multimedia information on the selected storage resource(s) (block 726). In a representative embodiment of the present invention, the multimedia information may be stored on a single storage resource, or may be spread across a number of storage resources. The broadband access gateway may then save information to enable later access to the stored multimedia information (block 728). Information that may permit later access may include, for example, one or more of a file name, a multimedia information type, a date, a size, a user identifier, and a storage resource identifier. The method shown in FIG. 7 then ends (block 730).

Aspects of the present invention may be found in a system supporting distribution and aggregation of multimedia information via a broadband access gateway. Such a system may comprise a gateway communicatively coupled to a broadband network and at least one wireless interface. The gateway may be capable of selectively exchanging multimedia information among the at least one wireless interface and the broadband network, and of communicating with the plurality of access devices via the at least one wireless interface. The gateway may also be capable of collecting, from at least a portion of the plurality of access devices, information identifying at least one storage resource available for the storage of multimedia information, and of receiving, from one of the plurality of access devices, a user request for storage of multimedia information. The gateway may be capable of selecting from the at least one storage resource, aggregate storage capacity for storing the multimedia information using the collected information, and of causing storage of the multimedia information using the selected aggregate storage capacity.

In various representative embodiments of the present invention, multimedia information may comprise at least one of streaming video, broadcast video, voice, digital data, text, digitized audio, digitized still images, digitized video, and digitized music. The information identifying the at least one storage resource may comprises at least one of an electronic serial number, an Internet protocol (IP) address, a media access control (MAC) address, an International Mobile Station Identifier (IMSI) address, a Mobile Identification Number (MIN) address, a manufacturer identifier, a model identifier, and a type identifier. The at least one wireless interface may be compliant with the Bluetooth V1.2 or compatible personal area network (PAN) specification, may communicate using an unlicensed frequency band, and may communicate at a frequency of approximately 2.4 gigahertz. The at least one wireless interface may be compliant with at least one of the Institute of Electrical and Electronics Engineers (IEEE) 802.11a, 802.11b, 802.11g, and 802.11n standards. The broadband network in a representative embodiment of the present invention may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network.

The gateway of a representative embodiment in accordance with the present invention may be capable of receiving at least one of information identifying an access device and information identifying a user, and of authenticating the user request based upon the received identifying information. The information identifying a user may comprise at least one of a member identifier, a user name, an administrative identifier, a digital certificate, and a credit card number. The information identifying an access device may comprise at least one of an electronic serial number, an Internet protocol (IP) address, a media access control (MAC) address, a manufacturer identifier, a model identifier, and a type identifier. The gateway may be capable of saving information enabling retrieval of the stored multimedia information from the selected aggregate storage capacity, and of managing retrieval of the stored multimedia information using the saved information. The at least one storage resource may comprise at least one of an access device, a hard disk drive, a compact disk (CD) drive, a digital versatile disk (DVD) drive, a digital video camera, and a storage service. The plurality of access devices may comprise at least one of a mobile multimedia handset, a personal digital assistant (PDA), a personal computer (PC), a personal video recorder (PVR), a video cassette recorder (VCR), and a digital camera. The request may be received via the at least one wireless interface, and the request may be received via the broadband network.

Other aspects of the present invention may be found in a method for supporting distribution and aggregation of multimedia information via a broadband access gateway. A method in accordance with a representative embodiment of the present invention may comprise collecting, from at least a portion of the plurality of access devices, information identifying at least one storage resource available for the storage of multimedia information. The method may also comprise receiving, from one of the plurality of access devices, a user request for storage of multimedia information, and selecting from the at least one storage resource, aggregate storage capacity for storing the multimedia information using the collected information. In addition, such a method may comprise causing storage of the multimedia information using the selected aggregate storage capacity. The method may also comprise exchanging multimedia information among at least one wireless interface and a broadband network. The at least one wireless interface may be compliant with the Bluetooth V1.2 or compatible personal area network (PAN) specification, may communicate using an unlicensed frequency band, and may communicate at a frequency of approximately 2.4 gigahertz. The at least one wireless interface may be compliant with at least one of the Institute of Electrical and Electronics Engineers (IEEE) 802.11a, 802.11b, 802.11g, and 802.11n standards. The broadband network may comprise at least one of a digital subscriber line (DSL) network, a cable network, a satellite network, a cellular network, and the Internet. The cellular network may comprise at least one of a global system for mobile communications (GSM) network, a time division multiple access (TDMA) network, a code division multiple access (CDMA) network, and a universal mobile telecommunications system (UMTS) network.

Multimedia information in various representative embodiments of the present invention may comprise at least one of streaming video, broadcast video, voice, digital data, text, digitized audio, digitized still images, digitized video, and digitized music. The information identifying the at least one storage resource may comprise at least one of an electronic serial number, an Internet protocol (IP) address, a media access control (MAC) address, an International Mobile Station Identifier (IMSI) address, a Mobile Identification Number (MIN) address, a manufacturer identifier, a model identifier, and a type identifier.

A representative embodiment of the present invention may also comprise receiving at least one of information identifying an access device and information identifying a user, and authenticating the user request based upon the received identifying information. The information identifying a user may comprise at least one of a member identifier, a user name, an administrative identifier, a digital certificate, and a credit card number. The information identifying an access device may comprise at least one of an electronic serial number, an Internet protocol (IP) address, a media access control (MAC) address, a manufacturer identifier, a model identifier, and a type identifier. A representative embodiment in accordance with the present invention may also comprise saving information enabling retrieval of the stored multimedia information from the selected aggregate storage capacity, and managing retrieval of the stored multimedia information using the saved information. The at least one storage resource may comprise at least one of an access device, a hard disk drive, a compact disk (CD) drive, a digital versatile disk (DVD) drive, a digital video camera, and a storage service. The plurality of access devices may comprise at least one of a mobile multimedia handset, a personal digital assistant (PDA), a personal computer (PC), a personal video recorder (PVR), a video cassette recorder (VCR), and a digital camera. The request may be received via the at least one wireless interface, and the request may be received via the broadband network.

Yet other aspects of the present invention may be observed in a machine-readable storage, having stored thereon a computer program having a plurality of code sections executable by a machine, for causing the machine to perform the operations of the method described above.

In a representative embodiment of the present invention, the wireless local area networks may include data networks such as, for example, Institute of Electrical and Electronics Engineer (IEEE) 802.11a/b/g/n compliant wireless networks such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiplex Access (TDMA), iDEN, Code Division Multiple Access (CDMA) and CDMA2000 1xRT, Universal Mobile Telecommunications System (UMTS) network, to name only a few.

A personal area network (PAN) may be formed by a plurality of wireless communication access devices such as, for example, mobile multimedia handsets, PDAs, telephones, and computers. Other elements of such a network may, for example, include computer peripherals such as digital scanners, digital cameras, printers, headphones, and pointing devices, that may be located within the immediate proximity of a person. A PAN may be an ad-hoc network of such communication devices. In a representative embodiment of the present invention, access devices within the PAN may communicate with other access devices within the PAN and also with other access devices that are located in other networks accessible via the PAN. The personal area networks may include data networks such as, for example, a Bluetooth compliant network, and Institute of Electrical and Electronics Engineer (IEEE) 802.15.3a compliant wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth® wireless PAN, a first Bluetooth®-enabled wireless access device may communicate with a second Bluetooth®-enabled wireless access device within the PAN. Additionally, either of the first and second Bluetooth®-enabled wireless access devices may communicate with the Internet or another LAN or WAN via the Bluetooth® wireless PAN.

In a representative embodiment of the present invention, a gateway may be adapted to provide seamless and transparent communication between a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

Content and application services are important because all the information coming into and leaving the home from either the WAN side (i.e., the broadband connection side), or from the PAN side (i.e., the access device side) converges at the gateway. The PAN side may comprise Bluetooth, wireless LAN (IEEE 802.11a/b/g/n), IEEE 802.15.3a ultra-wideband, or cellular, for example. Notwithstanding, the gateway may be adapted to convert, for example, wirelessly received GSM-formatted information into, for example, Internet protocol (IP)-formatted information and in reverse, converts IP-formatted information into wireless GSM-formatted information suitable for over-the-air transmission. Support for other wireless communication protocols such as TDMA, CDMA, and UMTS may also be provided. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention may leverage existing broadband infrastructure that is commonly found in many homes and businesses today. Because a consumer is already paying for the use of the broadband infrastructure in their home or office, leveraging the use of the existing broadband infrastructure for communication with wide area networks results in minimal or no communication costs. The broadband infrastructure may be, for example, a cable or DSL infrastructure.

The wireless interface function provided by the gateway located within a home, for example, may be utilized to route or communicate a great deal of traffic to a wired network such as a broadband network or a wireless network such as a GSM or CDMA network via a broadband connection. In other words, the wireless gateway infrastructure provided by a representative embodiment of the present invention provides a scalable network infrastructure that rides on an existing access infrastructure already supplied by a broadband service provider to a home, office or business. Additionally, the scalable infrastructure provided by the gateway also solves the problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. The gateways of existing systems fall short of realizing the full potential of the merged wired and wireless communication network that is enabled by a representative embodiment of the present invention. Numerous basic and enhanced communication services may be enabled or provided by the gateway. Support for access devices such as, for example, mobile multimedia handsets and PDAs may be involved in order to utilize these basic and enhanced communication services enabled by the new wave of digital technologies. Current and/or proposed mobile access gateway systems, however, do not provide the range of support needed for their use by the everyday consumer.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system supporting distribution and aggregation of multimedia information via a broadband access gateway, the system comprising:

a gateway communicatively coupled to a broadband network and at least one wireless interface, wherein the broadband network comprises one or more of a digital subscriber line (DSL) network, a cable network, a satellite network, the Internet and/or a cellular network comprising one or more of a global system for mobile communications (GSM) network, a time division multiple access (TDMA) network, a code division multiple access (CDMA) network, and/or a universal mobile telecommunications system (UMTS) network, wherein the at least one wireless interface is compliant with one or more of the Institute of Electrical and Electronics Engineers (IEEE) 802.11a, 802.11b, 802.11g, and/or 802.11n standards, and/or the Bluetooth V1.2 or compatible personal area network (PAN) specification, the gateway capable of selectively exchanging multimedia information among the at least one wireless interface and the broadband network, and of communicating with a plurality of access devices via the at least one wireless interface;

the gateway capable of collecting, from at least a portion of the plurality of access devices, information identifying at least one storage resource available for the storage of multimedia information;

the gateway capable of receiving, from one of the plurality of access devices, a user request for storage of multimedia information;

the gateway capable of selecting from the at least one storage resource, aggregate storage capacity for storing the multimedia information using the collected information;

the gateway capable of causing storage of the multimedia information using the selected aggregate storage capacity;

the gateway capable of receiving one or both of information identifying an access device and/or information identifying a user; and the gateway capable of authenticating the user request based upon the received identifying information.

2. The system according to claim 1 wherein multimedia information comprises one or more of streaming video, broadcast video, voice, digital data, text, digitized audio, digitized still images, digitized video, and/or digitized music.

3. The system according to claim 1 wherein the information identifying the at least one storage resource comprises one or more of an electronic serial number, an Internet protocol (IP) address, a media access control (MAC) address, an International Mobile Station Identifier (IMSI) address, a Mobile Identification Number (MIN) address, a manufacturer identifier, a model identifier, and/or a type identifier.

4. The system according to claim 1 wherein the at least one wireless interface communicates using an unlicensed frequency band.

5. The system according to claim 1 wherein the at least one wireless interface communicates at a frequency of approximately 2.4 gigahertz.

6. The system according to claim 1 wherein the information identifying a user comprises one or more of a member identifier, a user name, an administrative identifier, a digital certificate, and/or a credit card number.

7. The system according to claim 1 wherein the information identifying an access device comprises one or more of an electronic serial number, an Internet protocol (IP) address, a media access control (MAC) address, a manufacturer identifier, a model identifier, and/or a type identifier.

8. The system according to claim 1, further comprising:
the gateway capable of saving information enabling retrieval of the stored multimedia information from the selected aggregate storage capacity; and
the gateway capable of managing retrieval of the stored multimedia information using the saved information.

9. The system according to claim 1 wherein the at least one storage resource comprises one or more of an access device, a hard disk drive, a compact disk (CD) drive, a digital versatile disk (DVD) drive, a digital video camera, and/or a storage service.

10. The system according to claim 1 wherein the plurality of access devices comprises one or more of a mobile multimedia handset, a personal digital assistant (PDA), a personal computer (PC), a personal video recorder (PVR), a video cassette recorder (VCR), and/or a digital camera.

11. The system according to claim 1 wherein the request is received via the at least one wireless interface.

12. The system according to claim 1 wherein the request is received via the broadband network.

13. A method for supporting distribution and aggregation of multimedia information via a broadband access gateway, the method comprising:
collecting, from at least a portion of a plurality of access devices, information identifying at least one storage resource available for the storage of multimedia information;
receiving, from one of the plurality of access devices, a user request for storage of multimedia information;
selecting from the at least one storage resource, aggregate storage capacity for storing the multimedia information using the collected information;
causing storage of the multimedia information using the selected aggregate storage capacity;
exchanging multimedia information among at least one wireless interface and a broadband network, wherein the at least one wireless interface is compliant with one or more of the Institute of Electrical and Electronics Engineers (IEEE) 802.11a, 802.11b, 802.11g. and/or 802.11n standards and/or the Bluetooth V1.2 or compatible personal area network (PAN) specification, wherein the broadband network comprises one or more of a digital subscriber line (DSL) network, a cable network, a satellite network, the Internet and/or a cellular network comprising one or more of a global system for mobile communications (GSM) network, a time division multiple access (TDMA) network, a code division multiple access (CDMA) network, and/or a universal mobile telecommunications system (UMTS) network; and
receiving one or both of information identifying an access device and/or information identifying a user; and
authenticating the user request based upon the received identifying information.

14. The method according to claim 13 wherein the at least one wireless interface communicates using an unlicensed frequency band.

15. The method according to claim 13 wherein the at least one wireless interface communicates at a frequency of approximately 2.4 gigahertz.

16. The method according to claim 13 wherein multimedia information comprises one or more of streaming video, broadcast video, voice, digital data, text, digitized audio, digitized still images, digitized video, and/or digitized music.

17. The method according to claim 13 wherein the information identifying the at least one storage resource comprises one or more of an electronic serial number, an Internet protocol (IP) address, a media access control (MAC) address, an International Mobile Station Identifier (IMSI) address, a Mobile Identification Number (MIN) address, a manufacturer identifier, a model identifier, and/or a type identifier.

18. The method according to claim 13 wherein the information identifying a user comprises one or more of a member identifier, a user name, an administrative identifier, a digital certificate, and/or a credit card number.

19. The method according to claim 13 wherein the information identifying an access device comprises one or more of an electronic serial number, an Internet protocol (IP) address, a media access control (MAC) address, a manufacturer identifier, a model identifier, and/or a type identifier.

20. The method according to claim 13, further comprising:
saving information enabling retrieval of the stored multimedia information from the selected aggregate storage capacity; and
managing retrieval of the stored multimedia information using the saved information.

21. The method according to claim 13 wherein the at least one storage resource comprises one or more of an access device, a hard disk drive, a compact disk (CD) drive, a digital versatile disk (DVD) drive, a digital video camera, and/or a storage service.

22. The method according to claim 13 wherein the plurality of access devices comprises one or more of a mobile multimedia handset, a personal digital assistant (PDA), a personal computer (PC), a personal video recorder (PVR), a video cassette recorder (VCR), and/or a digital camera.

23. The method according to claim 13 wherein the request is received via the at least one wireless interface.

24. The method according to claim 13 wherein the request is received via the broadband network.

25. A machine-readable storage, having stored thereon a computer program having a plurality of code sections for operating a gateway supporting distribution and aggregation of multimedia information, the code sections executable by a machine for causing the machine to perform the operations comprising:

collecting, from at least a portion of a plurality of access devices, information identifying at least one storage resource available for the storage of multimedia information;

receiving, from one of the plurality of access devices, a user request for storage of multimedia information;

selecting from the at least one storage resource, aggregate storage capacity for storing the multimedia information using the collected information; and causing storage of the multimedia information using the selected aggregate storage capacity;

exchanging multimedia information among at least one wireless interface and a broadband network, wherein the at least one wireless interface is compliant with one or more of the Institute of Electrical and Electronics Engineers (IEEE) 802.11a, 802.11b, 802.11 g. and/or 802.11n standards and/or the Bluetooth V1.2 or compatible personal area network (PAN) specification, wherein the broadband network comprises one or more of a digital subscriber line (DSL) network, a cable network, a satellite network, the Internet and/or a cellular network comprising one or more of a global system for mobile communications (GSM) network, a time division multiple access (TDMA) network, a code division multiple access (CDMA) network, and/or a universal mobile telecommunications system (UMTS) network; and receiving one or both of information identifying an access device and/or information identifying a user; and authenticating the user request based upon the received identifying information.

26. The machine-readable storage according to claim 25 wherein the at least one wireless interface communicates using an unlicensed frequency band.

27. The machine-readable storage according to claim 25 wherein the at least one wireless interface communicates at a frequency of approximately 2.4 gigahertz.

28. The machine-readable storage according to claim 25 wherein multimedia information comprises one or more of streaming video, broadcast video, voice, digital data, text, digitized audio, digitized still images, digitized video, and/or digitized music.

29. The machine-readable storage according to claim 25 wherein the information identifying the at least one storage resource comprises one or more of an electronic serial number, an Internet protocol (IP) address, a media access control (MAC) address, an International Mobile Station Identifier (IMSI) address, a Mobile Identification Number (MIN) address, a manufacturer identifier, a model identifier, and/or a type identifier.

30. The machine-readable storage according to claim 25 wherein the information identifying a user comprises one or more of a member identifier, a user name, an administrative identifier, a digital certificate, and/or a credit card number.

31. The machine-readable storage according to claim 25 wherein the information identifying an access device comprises one or more of an electronic serial number, an Internet protocol (IP) address, a media access control (MAC) address, a manufacturer identifier, a model identifier, and/or a type identifier.

32. The machine-readable storage according to claim 25, wherein the code sections executable by a machine further causing the machine to perform the operations comprising:

saving information enabling retrieval of the stored multimedia information from the selected aggregate storage capacity; and managing retrieval of the stored multimedia information using the saved information.

33. The machine-readable storage according to claim 25 wherein the at least one storage resource comprises one or more of an access device, a hard disk drive, a compact disk (CD) drive, a digital versatile disk (DVD) drive, a digital video camera, and/or a storage service.

34. The machine-readable storage according to claim 25 wherein the plurality of access devices comprises one or more of a mobile multimedia handset, a personal digital assistant (PDA), a personal computer (PC), a personal video recorder (PVR), a video cassette recorder (VCR), and/or a digital camera.

35. The machine-readable storage according to claim 25 wherein the request is received via the at least one wireless interface.

36. The machine-readable storage according to claim 25 wherein the request is received via the broadband network.

37. A system supporting distribution and aggregation of multimedia information via a broadband access gateway, the system comprising:

a gateway communicatively coupled to a broadband network and at least one wireless interface, wherein the broadband network comprises one or more of a digital subscriber line (DSL) network, a cable network, a satellite network, the Internet and/or a cellular network comprising one or more of a global system for mobile communications (GSM) network, a time division multiple access (TDMA) network, a code division multiple access (CDMA) network, and/or a universal mobile telecommunications system (UMTS) network, wherein the at least one wireless interface communicates using an unlicensed frequency band and/or at a frequency of approximately 2.4 gigahertz, the gateway capable of selectively exchanging multimedia information among the at least one wireless interface and the broadband network, and of communicating with a plurality of access devices via the at least one wireless interface;

the gateway capable of collecting, from at least a portion of the plurality of access devices, information identifying at least one storage resource available for the storage of multimedia information;

the gateway capable of receiving, from one of the plurality of access devices, a user request for storage of multimedia information;

the gateway capable of selecting from the at least one storage resource, aggregate storage capacity for storing the multimedia information using the collected information;

the gateway capable of causing storage of the multimedia information using the selected aggregate storage capacity;

the gateway capable of receiving one or both of information identifying an access device and/or information identifying a user; and the gateway capable of authenticating the user request based upon the received identifying information.

38. The system according to claim 37 wherein the information identifying the at least one storage resource comprises one or more of an electronic serial number, an Internet protocol (IP) address, a media access control (MAC) address, an International Mobile Station Identifier (IMSI) address, a Mobile Identification Number (MIN) address, a manufacturer identifier, a model identifier, and/or a type identifier.

39. The system according to claim 37 wherein the information identifying a user comprises one or more of a member identifier, a user name, an administrative identifier, a digital certificate, and/or a credit card number.

40. The system according to claim 37 wherein the information identifying an access device comprises one or more of an electronic serial number, an Internet protocol (IP) address, a media access control (MAC) address, a manufacturer identifier, a model identifier, and/or a type identifier.

41. The system according to claim 37, further comprising:
the gateway capable of saving information enabling retrieval of the stored multimedia information from the selected aggregate storage capacity; and
the gateway capable of managing retrieval of the stored multimedia information using the saved information.

42. The system according to claim 37 wherein the request is received via the at least one wireless interface.

43. The system according to claim 37 wherein the request is received via the broadband network.

44. A method for supporting distribution and aggregation of multimedia information via a broadband access gateway, the method comprising:
collecting, from at least a portion of a plurality of access devices, information identifying at least one storage resource available for the storage of multimedia information;
receiving, from one of the plurality of access devices, a user request for storage of multimedia information;
selecting from the at least one storage resource, aggregate storage capacity for storing the multimedia information using the collected information;
causing storage of the multimedia information using the selected aggregate storage capacity;
exchanging multimedia information among at least one wireless interface and a broadband network, wherein the at least one wireless interface communicates using an unlicensed frequency band and/or at a frequency of approximately 2.4 gigahertz, wherein the broadband network comprises one or more of a digital subscriber line (DSL) network, a cable network, a satellite network, the Internet and/or a cellular network comprising one or more of a global system for mobile communications (GSM) network, a time division multiple access (TDMA) network, a code division multiple access (CDMA) network, and/or a universal mobile telecommunications system (UMTS) network; and
receiving one or both of information identifying an access device and/or information identifying a user; and
authenticating the user request based upon the received identifying information.

45. The method according to claim 44 wherein the information identifying the at least one storage resource comprises one or more of an electronic serial number, an Internet protocol (IP) address, a media access control (MAC) address, an International Mobile Station Identifier (IMSI) address, a Mobile Identification Number (MIN) address, a manufacturer identifier, a model identifier, and/or a type identifier.

46. The method according to claim 44 wherein the information identifying a user comprises one or more of a member identifier, a user name, an administrative identifier, a digital certificate, and/or a credit card number.

47. The method according to claim 44 wherein the information identifying an access device comprises one or more of an electronic serial number, an Internet protocol (IP) address, a media access control (MAC) address, a manufacturer identifier, a model identifier, and/or a type identifier.

48. The method according to claim 44, further comprising:
saving information enabling retrieval of the stored multimedia information from the selected aggregate storage capacity; and
managing retrieval of the stored multimedia information using the saved information.

49. A machine-readable storage, having stored thereon a computer program having a plurality of code sections for operating a gateway supporting distribution and aggregation of multimedia information, the code sections executable by a machine for causing the machine to perform the operations comprising:
collecting, from at least a portion of a plurality of access devices, information identifying at least one storage resource available for the storage of multimedia information;
receiving, from one of the plurality of access devices, a user request for storage of multimedia information;
selecting from the at least one storage resource, aggregate storage capacity for storing the multimedia information using the collected information; and
causing storage of the multimedia information using the selected aggregate storage capacity;
exchanging multimedia information among at least one wireless interface and a broadband network, wherein the at least one wireless interface communicates using an unlicensed frequency band and/or at a frequency of approximately 2.4 gigahertz, wherein the broadband network comprises one or more of a digital subscriber line (DSL) network, a cable network, a satellite network, the Internet and/or a cellular network comprising one or more of a global system for mobile communications (GSM) network, a time division multiple access (TDMA) network, a code division multiple access (CDMA) network, and/or a universal mobile telecommunications system (UMTS) network; and
receiving one or both of information identifying an access device and/or information identifying a user; and
authenticating the user request based upon the received identifying information.

50. The machine-readable storage according to claim 49 wherein the information identifying the at least one storage resource comprises one or more of an electronic serial number, an Internet protocol (IP) address, a media access control (MAC) address, an International Mobile Station Identifier (IMSI) address, a Mobile Identification Number (MIN) address, a manufacturer identifier, a model identifier, and/or a type identifier.

51. The machine-readable storage according to claim 49 wherein the information identifying a user comprises one or more of a member identifier, a user name, an administrative identifier, a digital certificate, and/or a credit card number.

52. The machine-readable storage according to claim 49 wherein the information identifying an access device comprises one or more of an electronic serial number, an Internet protocol (IP) address, a media access control (MAC) address, a manufacturer identifier, a model identifier, and/or a type identifier.

53. The machine-readable storage according to claim 49, wherein the code sections executable by a machine further causing the machine to perform the operations comprising:
saving information enabling retrieval of the stored multimedia information from the selected aggregate storage capacity; and
managing retrieval of the stored multimedia information using the saved information.

* * * * *